C. H. STOUT.
OPTICAL INSTRUMENT.
APPLICATION FILED JAN. 8, 1917.

1,254,741.

Patented Jan. 29, 1918.

Inventor:
Charles H. Stout
by Davis & Timms
his attorneys

UNITED STATES PATENT OFFICE.

CHARLES H. STOUT, OF ROCHESTER, NEW YORK, ASSIGNOR TO CROWN OPTICAL COMPANY, OF ROCHESTER, NEW YORK, A CORPORATION OF NEW YORK.

OPTICAL INSTRUMENT.

1,254,741.

Specification of Letters Patent.  Patented Jan. 29, 1918.

Application filed January 8, 1917.  Serial No. 141,139.

*To all whom it may concern:*

Be it known that I, CHARLES H. STOUT, a citizen of the United States, and resident of Rochester, in the county of Monroe and State of New York, have invented certain new and useful Improvements in Optical Instruments, of which the following is a specification.

The present invention relates to optical instruments and more particularly to the eye-pieces thereof, an object of this invention being to provide an improved stop for limiting the outward adjustment of the eye-piece and adapted to be inexpensively manufactured and at the same time having maximum strength.

To this and other ends the invention consists of certain parts and combinations of parts, all of which will be hereinafter described, the novel features being pointed out in the appended claims.

In the drawings:—

Figure 1:
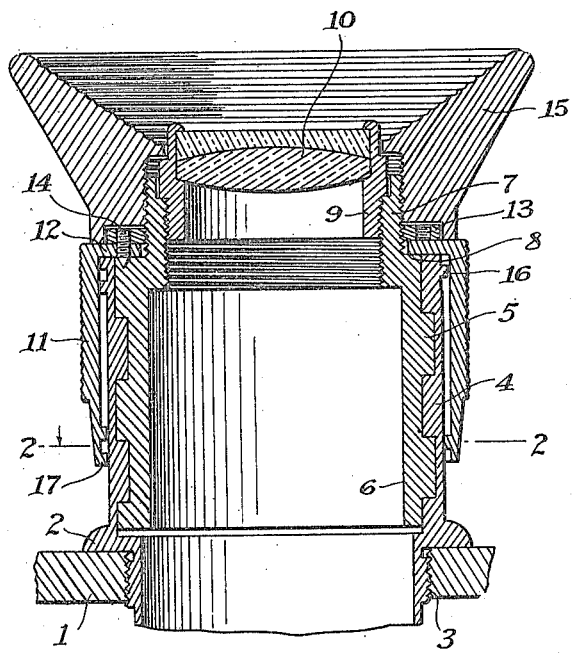
Figure 1 is a vertical section of an eye-piece constructed in accordance with this invention.
Figure 3:
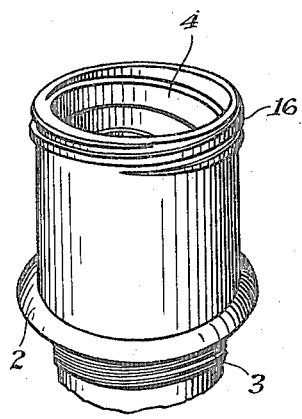
Fig. 3 is a perspective view of a stationary sleeve or tube which forms part of any suitable optical instrument, being in this instance embodied in a binocular telescope.
Figure 4:
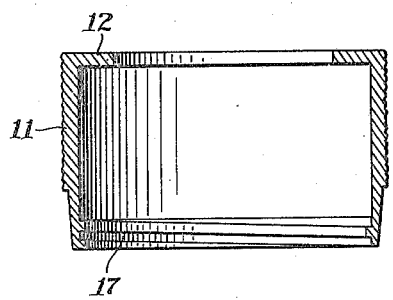
Fig. 4 is a vertical section through a diopter ring used in the illustrated construction.
Figure 2:
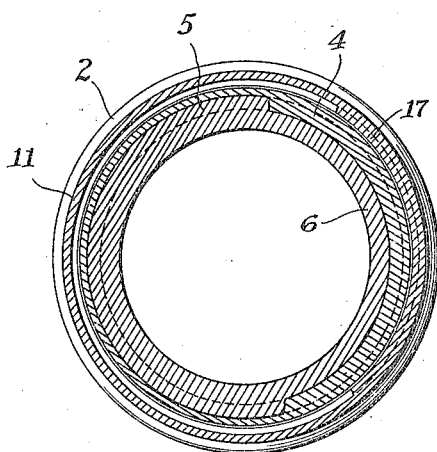
Fig. 2 is a horizontal section on the line 2—2, Fig. 1.

Referring more particularly to the drawings, 1 indicates the casing of any suitable optical instrument such as a binocular telescope. Into this casing the stationary sleeve or tube 2 is screwed or otherwise attached at 3. This sleeve has internal threads 4 engaged by external threads 5 on an eye-piece tube or carrier 6. The upper end of this eye-piece tube or carrier is reduced at 7, to provide a shoulder 8, and this reduced portion is threaded both interiorly and exteriorly. The interior threads are engaged by external threads on an eye-piece mounting 9 carrying an eye-piece lens 10 of any suitable form.

On the eye-piece tube 6 a diopter ring 11 is mounted, this ring depending about the stationary sleeve and having an inwardly-projecting flange 12 at one end for engagement with the seat or shoulder 8 on the eye-piece tube 6, being adjustably secured thereto by a clamping ring 13 which engages the external threads on the reduced portion of the eye-piece tube 6. A screw 14 extends through the clamping ring 13 and the flange 12 to hold the clamping ring and the diopter ring against movement on the eye-piece tube 6. An eye-cap 15 also engages the external threads on the reduced portion of the eye-piece tube 6 and covers the clamping ring 13. The flange 12 of the clamping ring serves to limit the inward movement of the eye-piece tube 6.

The feature of this invention is the construction of the devices for limiting the outward movement of the eye-piece. These devices comprise external threads 16 on the sleeve 2 and internal threads 17 on the diopter ring 11, the threads 16 being situated at the upper end of the sleeve 2 and the latter being provided with a smooth portion below said thread, whereas the threads 17 are situated at the lower edge of the diopter ring and the internal smooth portion is provided above said threads. During the adjustment of the eye-piece tube 6, the threads 17 operate over the smooth portion below the thread 16, and the latter operate over the smooth portion above the threads 17. If the eye-piece is moved too far in an upward or outward direction, the upper portion of the threads 17 will coöperate with the lower portion of the threads 16 and thus effectively stop the eye-piece. This is not only due to the fact that the pitch of the threads 16 and 17 is less than that of the threads 4 and 5, but is also due to the fact that the lead portions of the threads 16 and 17 do not coincide when the engagement takes place. To remove the eye-piece, it is necessary to remove the cap 15 and loosen the clamping ring 13 so that the diopter ring may be turned with reference to the eye-piece 6 to bring the lead portions of the threads 16 and 17 into coincidence.

According to this invention, stops are provided which may be formed integrally with the parts by which they are carried, thus making it unnecessary to provide separate devices. Furthermore, these stops provide wide bearing surfaces substantially continuous about the stationary tube and the diopter ring, so that there is no tendency to distort or twist the parts when the stops are brought into coöperation.

What I claim as my invention and desire to secure by Letters Patent is:—

1. An optical instrument, a stationary sleeve, an eye-piece tube axially adjustable in the sleeve, a diopter ring mounted on said eye-piece tube and depending therefrom about the stationary sleeve, screw threads on the inner face of the diopter ring and the outer face of the stationary sleeve, the diopter ring having a smooth inner face above the threads whereas the stationary ring has a smooth outer face below its threads so that the threads on each part may operate over a smooth portion on the other part during the adjustment of the eye-piece and will coöperate to limit the normal outward adjustment.

2. In an optical instrument, a stationary sleeve, an eye-piece tube axially adjustable in the sleeve, a diopter ring mounted on said eye-piece tube and depending therefrom about the stationary sleeve, and two stops for limiting the outward axial movement of the eye-piece tube, one arranged on the inner face of the diopter ring and the other arranged on the outer face of the sleeve, at least one of said stops being in the form of screw threads, while the other is formed to permit the diopter ring to be turned to effect coöperation between the stops in order to enable the diopter ring to be detached from the stationary tube over the free end of the latter.

CHARLES H. STOUT.

Copies of this patent may be obtained for five cents each, by addressing the "Commissioner of Patents, Washington, D. C."